Dec. 18, 1928.

F. W. WESTON 1,695,446

COOLING SYSTEM CONTROL

Filed June 8, 1922

2 Sheets-Sheet 1

Inventor
Frederick W. Weston
By Geo. J. Haight
His Atty.

Dec. 18, 1928.
F. W. WESTON
1,695,446
COOLING SYSTEM CONTROL
Filed June 8, 1922
2 Sheets-Sheet 2
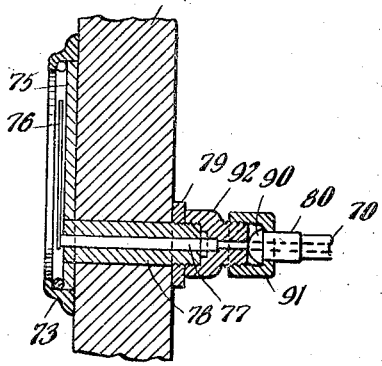
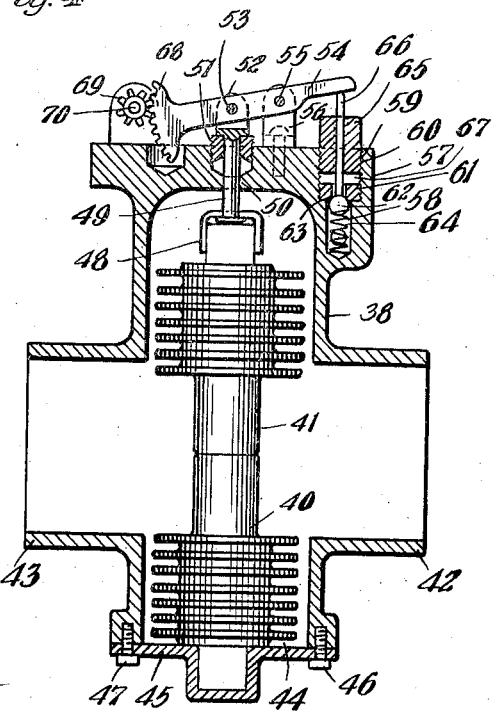
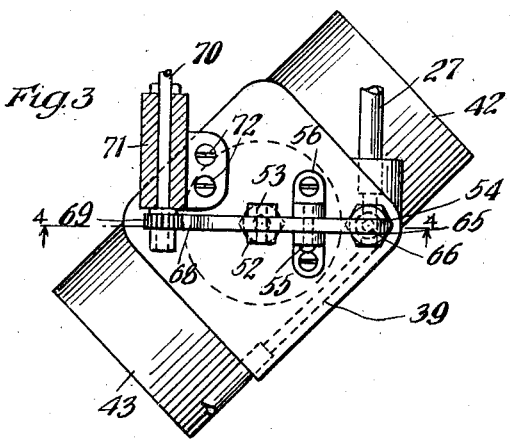
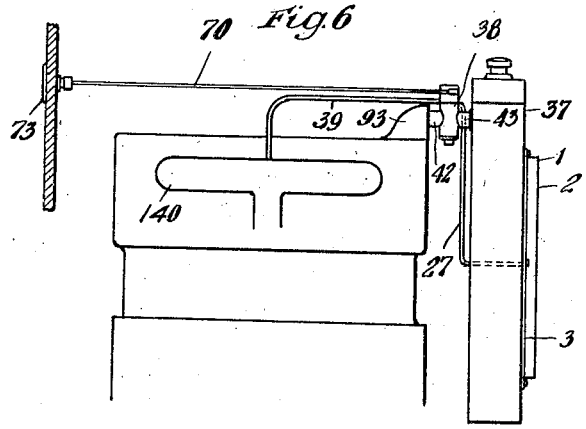
Inventor
Frederick W. Weston
By Geo. J. Haight
His Atty.

Patented Dec. 18, 1928.

1,695,446

UNITED STATES PATENT OFFICE.

FREDERICK W. WESTON, OF CHICAGO, ILLINOIS.

COOLING-SYSTEM CONTROL.

Application filed June 8, 1922. Serial No. 566,884.

This invention relates to improvements in apparatus for automatically controlling and indicating temperature of internal combustion engines.

I am aware that it has been a common practice to provide a thermostatically controlled means for operating shutters in connection with the cooling system of an automobile to properly control the heat of the motor and that it is also common to provide means for indicating the temperature at which the motor is operating. However, it is new as far as I am aware, to operate the mechanism which opens and closes the shutters by suction created by the running of the motor and it is also new to provide a single thermostatic means for controlling the suction and also indicating the temperature at which the motor is operating.

One object of the invention is to provide simple and efficient means controlled by the temperature of internal combustion engines or motors for regulating the temperature of the same.

A more specific object of the invention is to provide suction operated means, thermostatically controlled for actuating an apparatus for regulating the amount of circulated air admitted to the cooling means of internal combustion engines.

Another object of the invention is to provide suction actuated mechanism controlled by the operation of the internal combustion engine to cut off the supply of cooling air when the engine is stopped. Another object of the invention is to provide means for indicating the operating temperature of the motor at all times so that it may readily be determined if the motor is functioning properly.

Another object of the invention is to combine in a single apparatus, means for controlling the temperature of and indicating the operating temperature of internal combustion engines.

Another object of the invention is to provide a mechanism of the class described, wherein the apparatus for regulating the temperature of the motor and the device for indicating the operating temperature of the motor, are controlled by the same thermo-sensitive device.

Figure 1:
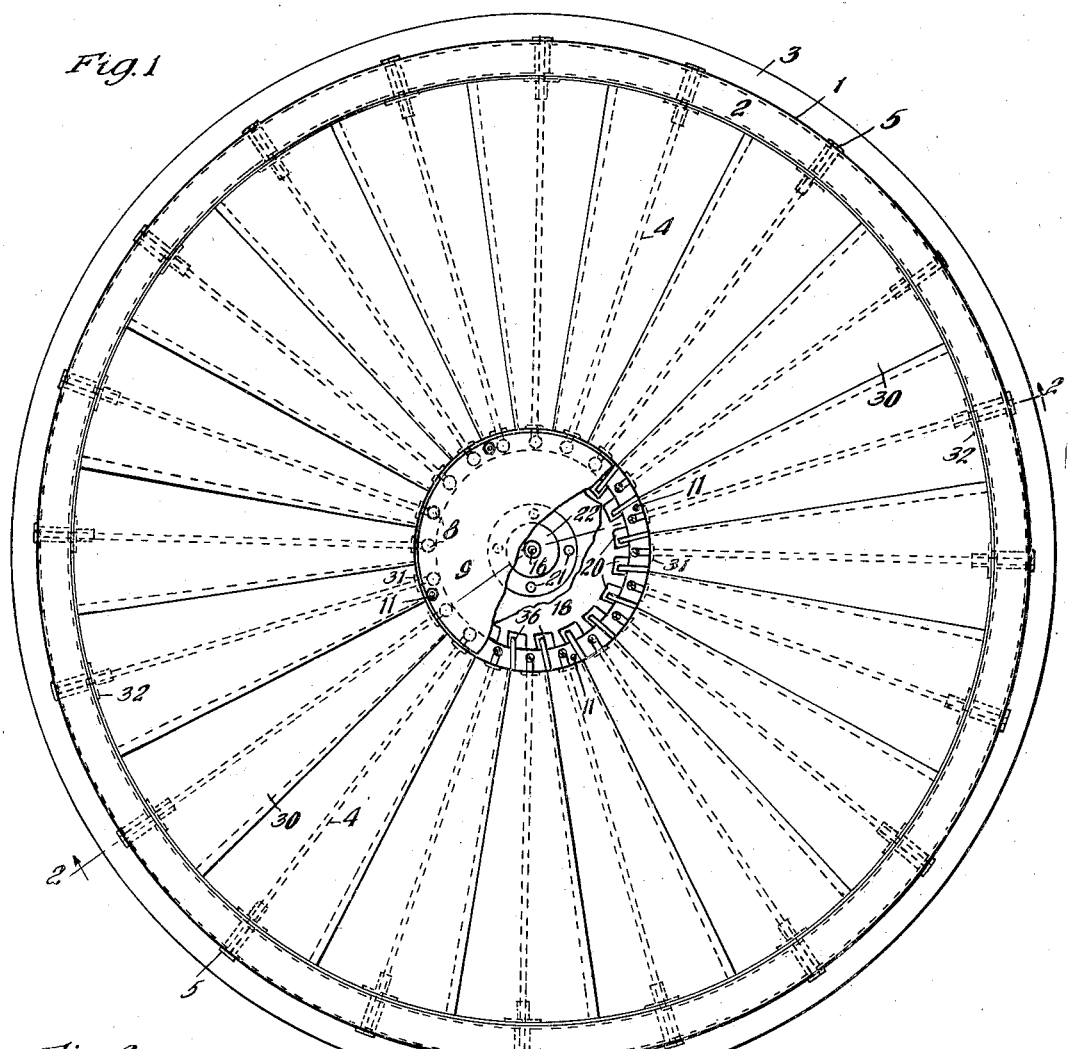
Figure 2:
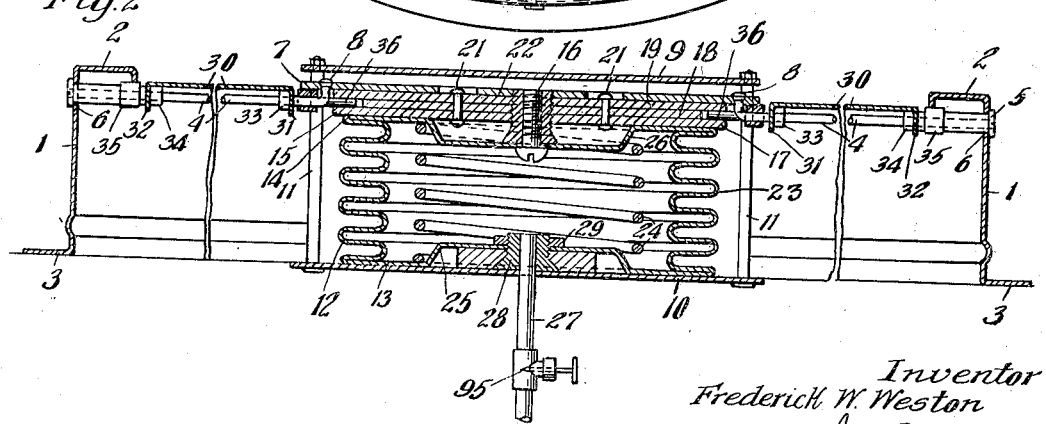

In the drawings forming a part of this specification, Figure 1 shows a plan new of the annular shutter member, partly broken away to show the means for operating the shutters. Fig. 2 shows a section on the line 2—2 of Fig. 1, disclosing, in detail, the expansible and contractible motor. Fig. 3 is a plan view of the thermostat-containing casing showing the operating connections for the indicator and the shutters. Fig. 4 is a transverse section of Fig. 3 showing the parts in detail. Fig. 5 is a section through the instrument board of an automobile showing the arrangement of the indicator dial. Fig. 6 is a side elevation of an automobile motor and radiator showing the manner of connecting my improved apparatus therewith.

In the drawings, 1 indicates an annular ring-shaped shell or casing having angularly projecting flanges 2 and 3. Carried by the annular shell 1 are radially extending rods 4 of a bicycle spoke type connected thereto by internally threaded sleeves, received within the recesses 6. The opposite ends of the radially extending rods 4 are connected to a ring-shaped plate 7 by means of angularly extending headed curved ends 8. The ring-shaped plate 7 is thus rigidly supported by the spokes from the annular member 1. Plates 9 and 10 are rigidly connected in fixed position and relatively spaced by bolts 11 extending through and secured to the ring 7.

Suitably supported between the fixed plates 9 and 10 is an expansible and contractible bellows motor 12 having an inner wall 13 abutting the plate 10, and outer wall 14 secured to the crank disc 15 by means of a screw 16, and convoluted side wall 23. The crank disc is composed of the plates 17, 18 and 19. The plate 18 is provided with recesses 20 which co-act with means hereinafter described to rotate the shutters to open and close the same. The plates 17, 18 and 19 are rigidly secured together by rivets 21 and a lock nut 22 is provided to prevent separation of the crank disc and the wall 14. Within the bellows motor, a spring 24 is located, centered by bosses 25 and 26 on the walls 13 and 14 respectively, and acting to hold the motor normally in expanded condition. Connected to the bottom wall 13 is a tube 27 leading to a valve for controlling the suction, hereinafter to be described. The tube 27 passes through the plate 10, being properly secured to the screw-thread plug 28 so as to make the connection air-tight. The plug 28 is held in position by means of a locking nut 29.

The annular shutter comprises a series of radially extending shutter blades or slats 30 loosely pivoted on the rods 4 by means of angular projections 31 and 32 at opposite ends thereof. Spacing collars 33, 34 and 35 are provided to hold the blades in proper position. Each of the blades 30 is provided with a crank pin 36, received within a corresponding recess 20 of the plate 18.

As shown in Fig. 6, the annular casing 1 is secured to the outer side of the automobile radiator 37. The ordinary type of radiator being of more or less rectangular outline, it is desirable that means be provided to cover the outer portion of the radiator which would not be covered by the annular member 1. To cover this portion of the radiator, I preferably provide a sheet of leather or other suitable flexible material having an annular opening therein to slip over the casing 1 and lie over the flange 3 thereof. The flange member 3 will be secured by bolts or other suitable means to the radiator proper.

As shown in Fig. 6, the pipe 27 is connected with a T-casing 38 containing the thermostat and the valve for controlling the suction created within the chamber of motor 12. Another pipe 39 forms a connection between the intake manifold 140 of the motor and the casing 38 to provide suction for the operation of the shutter.

As shown in Fig. 4, the casing 38 is formed with a main chamber in which the thermostats 40 and 41 are located, and end nipples 42 and 43. The lower part of the casing 38 has an opening 44 being closed by a plate 45 secured by screws 46 and 47. The thermostat 41 rests upon the upper end of the thermostat 40 and has connected thereto by means of the yoke 48, a forked rod 49. The rod 49 is so mounted as to reciprocate in a bore 50 and packing nut 51. The upper forked end 52 is pivotally connected by means of a pin 53 to the lever 54, pivotally mounted at 55 in a fork-shaped bracket 56. The thermostat 40 is gauged to respond to a temperature of 180° and the thermostat 41 is gauged to respond to a temperature of 150°. As the temperature of the cooling medium flowing through the casing 38 rises, the thermostat 41 will be expanded, the thermostat 40 remaining inactive, thus forming an abutment for the lower end of the thermostat 41. When the temperature of the cooling medium reaches 180°, the thermostat 40 will also be expanded lifting the thermostat 41, thereby giving an additional movement to the lever 54. The upper end 57 of the casing 38 is provided with a thickened portion recessed as shown at 58 to receive the valve mechanism which controls the suction. The recess 58 is enlarged at its upper end as shown at 59 and provided with screw threads 60. Threaded within the lower portion of the recesses 59 is a ring-shaped collar 61 which confines a ball valve 62 within the recess 58. The ball 62 is held in contact with the valve seat 63 of the collar 61 by means of a spring 64 seated against the lower end of the recess 58. The upper portion of the recess 59 is closed by means of a threaded sleeve 65 which forms a guide for a rod 66 for operating the ball valve 62. As will be noted upon reference to Fig. 4, the collar 61 and sleeve 65 are spaced apart so as to provide a chamber 67. The pipe 39 communicating with the intake manifold 40 connects with the chamber 67, and the pipe 27 connecting with the motor 12 communicates with the lower end of the recess 58 as shown in Fig. 4. The pivoted lever 54 carries a toothed segment 68 at one end engaging a pinion 69 mounted on a shaft 70 journaled in the bearing 71. The bearing 71 is secured to the casing 38 by means of screws 72. The end of the lever opposite to the segment 68 bears on the rod 66 and when rocked by the expansion of the thermostats 40 and 41, operates the valve 62 to allow the suction of the motor to effect the contraction of the motor 12.

The shaft 70 is flexible and has the end opposite to the pinion 69 connected to an indicator on the instrument board.

As shown in Fig. 5, the indicator 73 is mounted on the instrument board 74 and comprises a dial 75 and a pointer 76. The latter is rigidly connected for rotation with the shaft 77 coupled to the flexible shaft 70. The indicator 73 is shown as held to the instrument board by means of the threaded boss 78 extending through the board 74 and held in position by lock nut 79. The flexible shaft 70 is enclosed by the usual casing 80, swivelly connected by means of the head 90 and sleeve 91 to the sleeve 92 secured to the boss 78.

It will be seen that upon oscillation of the lever 54, the pinion 69 will be rotated thereby rotating the shaft 70 and operating the pointer 76.

The casing 38 is interposed between the radiator 37 and the intake 93 of the engine water jacket, the end 42 being connected to the radiator and the end 43 to the intake 93.

The operation of my invention is as follows: The blades 30 are normally in closed position and the motor 12 expanded as shown in Fig. 2. Upon suction being created through the pipe 27, the motor 12 will contract and move the crank plate downwardly away from the ring 7 as shown in Fig. 2, thus moving the crank pins 36 in a downward direction and rocking the blades 30 upon their pivots to open the same. It will be noted that the recesses 20 in the plate 18 are of such a size as to allow for the lateral movement of the pins 36 produced during the rocking of the blades. When the blades are thus opened, air will be admitted to the cooling surfaces of the radiator and prevent the temperature of the cooling liquid from rising too rapidly. Upon the suction being removed, the spring 24 will return the motor 12 to its normal expanded condition, moving therewith the crank plate and rotating the blades so as to close the shutter. As will be obvious, the circulation of the cooling medium from the engine through the casing 38 to the radiator will influence the thermostats 40 and 41 to expand or contract according to the temperature of the cooling liquid. The parts are so arranged that when the cooling liquid reaches a predetermined temperature, the thermostats will become effective to operate the lever 54, thus depressing the valve 62 and allowing communication to be established between the tube 27 leading to the motor 12 and the pipe 39 leading to the intake manifold of the motor, thus allowing the suction due to the operation of the engine to become operative to contract the motor 12, opening the blades 30 and thereby allowing the air to circulate through the radiator. The thermostats 40 and 41 also operate the means for indicating the temperature of the motor through the lever 54, and when this lever is rocked, as previously described, the pinion 69 will be rotated and the indicating member 76 moved to correspond therewith to properly indicate the temperature of the motor.

Although the shutter of my improvements is operated by suction derived from the intake manifold of the engine, it will be noted that I do not impose any undesirable burden upon the engine, inasmuch as when my suction motor 12 has once been contracted, no further effort from the intake manifold is required, other than to merely maintain the suction motor 12 in its contracted position. When the suction from the intake manifold is cut off from the suction motor 12, a slight amount of leakage is permitted through the sleeve 65 around the stem 66, sufficient to break the vacuum within the suction motor 12 and allow the spring 24 to expand and restore the suction motor to its normal condition.

In the drawings, I have shown a shutter of circular form, but as will be understood by those skilled in the art, it may take other forms and many variations may be made in the details of construction and particularly with respect to the shutter blades or slats, without in any wise departing from the spirit of the invention.

I have herein shown and described what I now consider the preferred manner of carrying out my invention, but the same is merely illustrative and I contemplate all changes and modifications that come within the scope of the claims appended hereto.

I claim:

1. In an apparatus for automatically controlling the temperature of internal combustion engines, the combination with a cooling system, including a radiator adapted to have a motor-cooling fluid circulate therethrough, said radiator being subject to a cooling air current for cooling said fluid; of means for cutting off the air current comprising an annular series of shutter blades, each of said blades being rotatable on a longitudinal axis thereof; a heat responsive device associated with said cooling system so as to be in the circulatory path of said fluid and suction operated mechanism controlled by said device for operating said means to rotate said blades to adjust the same and thereby regulate the temperature of the engine.

2. In an apparatus for automatically controlling the temperature of a motor; the combination with a cooling system including a radiator subject to a cooling air current; of means for cutting off the air current, comprising a series of shutter blades radially disposed with reference to a common center, each of said blades being mounted for rotation on its longitudinal axis; suction operated mechanism at the center of said blades for operating said shutter blades to open the same; and means for returning said mechanism to normal condition and closing the shutters when the suction is discontinued.

3. In an apparatus for automatically controlling the temperature of motors: the combination with a cooling system, including a radiator, subject to a cooling air current; of means for cutting off the air current, comprising a series of pivoted shutter blades; and a suction operated device about which said blades are radially disposed and to which all of said blades are pivoted for operating said pivoted shutter blades to thereby regulate the temperature of the motor.

4. In an apparatus for automatically controlling the temperature of motors: the combination with a cooling system, including a radiator subject to a cooling air current; of means for cutting off the air current to regulate the temperature of the motor, said means comprising an annular series of radially disposed shutter blades, each provided with a crank arm, a plate centrally disposed with respect to said radially arranged blades, said plate being operatively connected to all of said crank arms to rotate the same and operate the shutter plates to cut off the air current; and an expansible and contractible suction-operated device for reciprocating said plate.

5. In an apparatus for automatically controlling the temperature of motors, the combination with a cooling system, including a radiator subject to a cooling air current; of means for cutting off the air current including a series of pivoted shutter blades radially disposed with reference to a common axis; and means on the same side of said radiator as said blades and movable lengthwise of said axis for operating said pivoted blades to thereby regulate the temperature of the motor.

6. In an apparatus for controlling the temperature of internal combustion engines having an intake manifold and radiating means for cooling the engine, the combination with a shutter adapted to open and close to admit or prevent a cooling current of air to impinge against said radiating means; of a suction motor for actuating said shutter; a valve mechanism for said suction motor; an indicator mechanism; and common means for directly actuating said valve mechanism and indicator mechanism, including a thermo-sensitive means, operable in accordance with the temperature of the engine, for automatically controlling the operation of said suction motor.

7. In an apparatus for controlling the temperature of internal combustion engines having an intake manifold and radiating means for cooling the engine, the combination with a shutter mechanism adapted to open and close to admit or prevent a cooling current of air to impinge against the radiating means; of a suction motor including a flexible diaphragm and a reciprocable end wall, said end wall being directly connected with said shutter mechanism to operate the same upon movement of said end wall; and thermo-sensitive means operable in accordance with the temperature of the engine for automatically controlling the operation of said suction motor.

8. In an apparatus for automatically controlling the temperature of water cooled motors of motor vehicles, the combination with a cooling system including a radiator through which the water cooled circulates subject to a cooling air current, said radiator being mounted at the front end of the vehicle, said radiator having water circulating connections with the motor; of shutter means in front of the radiator for reducing and cutting off the air current to regulate the temperature of the motor; a suction operated device for operating said shutter means, said device being mounted at the same side of the radiator as said shutter means; a common readily detachable support on which said shutter means and suction operated device are permanently mounted, thereby providing for ready application of said shutter means and suction device as a unit to said radiator; and thermostatic means for controlling the operation of said suction device, said thermostatic means being in the path of movement of the circulating water.

9. In an apparatus for automatically controlling the temperature of a motor; the combination with a cooling system therefor, including a radiator subject to a cooling air current; of means for controlling said air current including an actuating member; a thermostat for operating said actuating member for effecting movement of said air controlling means; and a second thermostat operative at a higher temperature than said first named thermostat and arranged in abutment therewith so as to move said first-named thermostat bodily to give additional movement to said actuating member.

In witness that I claim the foregoing I have hereunto subscribed my name this 2nd day of June, 1922.

FREDERICK W. WESTON.